UNITED STATES PATENT OFFICE.

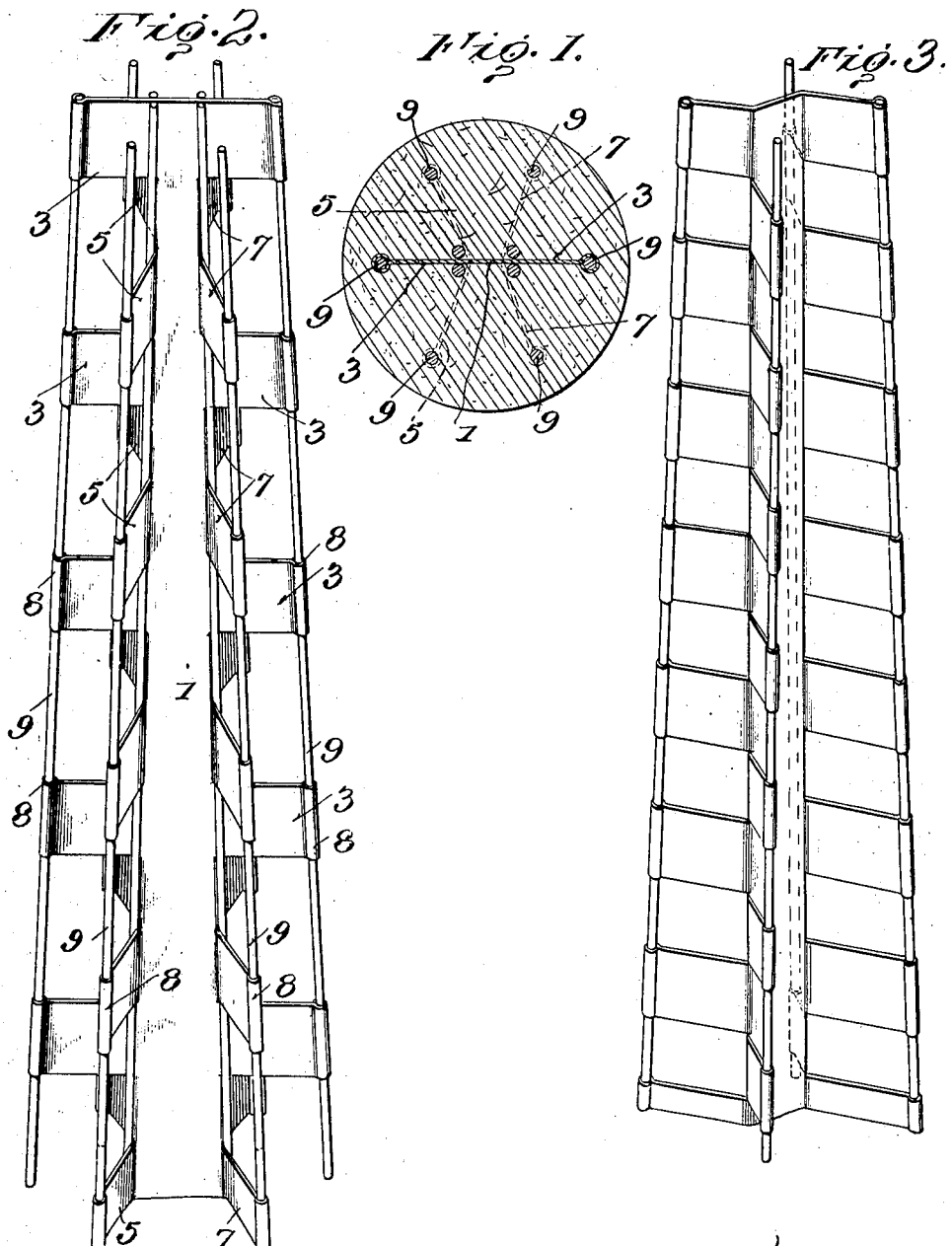

WILLIAM F. KERLIN, OF ROCKFIELD, AND EDWARD W. BOWEN, OF DELPHI, INDIANA.

REINFORCING DEVICE.

No. 926,006.　　　Specification of Letters Patent.　　　Patented June 22, 1909.

Application filed April 27, 1909. Serial No. 492,573.

*To all whom it may concern:*

Be it known that we, WILLIAM F. KERLIN and EDWARD W. BOWEN, citizens of the United States of America, and residents of Rockfield, Indiana, and Delphi, Indiana, respectively, have invented certain new and useful Improvements in Reinforcing Devices, of which the following is a specification.

This invention relates to certain new and useful improvements in reinforcement for plastic material such, for example, as the reinforcements shown in our application, Ser. No. 433,744, filed May 19, 1908, and the object of the invention is to provide a novel reinforcement for a plastic body comprising a sheet of metal provided with blades extending in various directions, in order to insure the maximum reinforcement to a small quantity of material, the said blades being reinforced by wires or rods which act to strengthen the same and make effective resistance to any jar or pressure coming upon any part of the body when completed.

The invention may be embodied in different forms but two forms are shown in the drawings accompanying and forming part hereof, in which—

Figure 1 is a cross section of a reinforced plastic post made in accordance with my invention, the reinforcement being embedded therein. Fig. 2 is a perspective view of the reinforcement without the plastic material. Fig. 3 is a view similar to Fig. 2 but of a modified construction.

Referring now to the details of the drawings by numerals— 1 designates a strip of metal of proper length and width which is slitted to form two sets of blades on opposite sides of the body portion 1. These blades are formed by slitting the material on opposite sides of the body 1 at predetermined intervals, and, as shown in Fig. 2, every third blade 3 is kept in alinement with the body 1 while the intermediate blades 5 and 7 are bent on opposite sides of the body portion and at an angle thereto. There are thus in the form shown in Figs. 1 and 2 six sets of blades, two sets, on opposite sides, being in alinement with the body 1, and the other four sets projecting at an angle from said body 1 and arranged on opposite sides of the body as clearly shown in said figures. The free ends of the blades are preferably bent to form sleeves 7 which are employed for the purpose of securing wires or rods 9 which rods are for the purpose of holding all of the blades in alinement, there being one wire or rod for each row of blades, and each rod holding all the blades of its row substantially in alinement.

In the modification shown in Fig. 3 the construction is the same as that shown in Figs. 1 and 2 except that there are only four sets of blades instead of six, the blades projecting from the body in alinement therewith being omitted from this form. In other words, this form is exactly the same as the form shown in Figs. 1 and 2 except that there are no blades in alinement with the body.

From the foregoing and accompanying drawings, it will be seen that we have provided a reinforcement for plastic bodies which offers very effective resistance to any jar or pressure coming upon the body and that a body of plastic material reinforced with my device will offer the greatest strength in proportion of the amount of metal employed.

The invention shown herein is broadly protected in my aforesaid application filed May 19, 1908, Ser. No. 433,744.

What we claim as our invention is:

1. A metallic reinforcement for plastic material comprising a flat body portion having a plurality of blades projecting from opposite edges thereof, said blades projecting at an angle to the body portion at opposite sides thereof, and wires or rods connecting the blades together, there being one wire or rod for each set of blades and each wire or rod holding all the blades of its set in alinement.

2. A metallic reinforcement for plastic material comprising a flat body portion having several rows of blades projecting from opposite edges thereof, one row on each side remaining in alinement with the face of the body, and the other rows extending at an angle to the face of the body and disposed at opposite sides of the body, and wires or rods connecting the blades together.

3. A metallic reinforcement for plastic material comprising a flat body portion having its opposite edges slitted at predetermined distances throughout its length to form blades, said blades projecting at an angle to the body portion at opposite edges thereof and wires or rods connecting the said blades together, there being one wire or rod for each set of blades and each wire or rod holding all the blades of its set in alinement.

4. A metallic reinforcement for plastic material comprising a flat body portion having its opposite edges slitted at predetermined distances throughout its length to form blades, some of the blades remaining in alinement with the face of the body and other blades extending at an angle to the face of the body and disposed at opposite edges of said body, said blades having wire engaging means thereon.

Signed by us at Delphi, Indiana, this 22nd day of April, 1909.

WILLIAM F. KERLIN.
EDWARD W. BOWEN.

Witnesses:
B. M. WILSON,
N. HAUGHEY.